US010019139B2

(12) United States Patent
Smith et al.

(10) Patent No.: US 10,019,139 B2
(45) Date of Patent: Jul. 10, 2018

(54) SYSTEM AND METHOD FOR CONTENT SIZE ADJUSTMENT

(71) Applicants: Michael David Smith, Seattle, WA (US); John F. J. Mellor, London (GB)

(72) Inventors: Michael David Smith, Seattle, WA (US); John F. J. Mellor, London (GB)

(73) Assignee: GOOGLE LLC, Mountain View, CA (US)

( * ) Notice: Subject to any disclaimer, the term of this patent is extended or adjusted under 35 U.S.C. 154(b) by 231 days.

(21) Appl. No.: 13/677,995

(22) Filed: Nov. 15, 2012

(65) Prior Publication Data

US 2015/0220232 A1 Aug. 6, 2015

Related U.S. Application Data

(60) Provisional application No. 61/559,784, filed on Nov. 15, 2011.

(51) Int. Cl.
*G06F 3/0484* (2013.01)
*G06F 3/0485* (2013.01)
(Continued)

(52) U.S. Cl.
CPC ........ *G06F 3/0484* (2013.01); *G06F 3/04883* (2013.01); *G06F 17/214* (2013.01); *G06F 17/30905* (2013.01); *G06F 3/0485* (2013.01); *G06F 3/0488* (2013.01); *G06F 3/04845* (2013.01); *G06F 2203/04806* (2013.01)

(58) Field of Classification Search
CPC .... G06F 17/214; G06F 3/0484; G06F 3/0485; G06F 3/04845; G06F 3/0488; G06F 3/04883; G06F 17/30905; G06F 2203/04806

See application file for complete search history.

(56) References Cited

U.S. PATENT DOCUMENTS 8,358,852 B2 * 1/2013 Bastos dos Santos et al. ............................ 382/203
8,683,377 B2 * 3/2014 Zuverink et al. ............. 715/784
(Continued)

OTHER PUBLICATIONS

IndubitablyMe, 'Using Adobe Reader for eBooks', BlackBerry Forums at CrackBerry.com, Jun. 13, 2011 at 11:44 AM [retrieved on Oct. 1, 2014 ].Retrieved from the Internet: <URL: http://forums.crackberry.com/playbook-apps-games-f243/using-adobe-reader-ebooks-622918-print/ >.*

*Primary Examiner* — Abdullah Al Kawsar
*Assistant Examiner* — David S Posigian
(74) *Attorney, Agent, or Firm* — McDermott Will & Emery LLP

(57) ABSTRACT

Methods and systems for inferring and predicting the desirable font size of a content area are disclosed. An example method may include detecting a use gesture changing a size of a first content area displayed on a touchscreen, determining that the user has found an optimal font size based on the user gesture detected, and calculating an average that size of the first content area. The method may further include receiving an indication to display a second content area and displaying the second content area on the touchscreen. The method may also include adjusting the font size of the second content area based on the average font size of the first content area, and displaying the second content area with the adjusted font size on the touchscreen.

28 Claims, 8 Drawing Sheets

(51) Int. Cl.
  *G06F 3/0488*   (2013.01)
  *G06F 17/21*   (2006.01)
  *G06F 17/30*   (2006.01)

(56) References Cited

U.S. PATENT DOCUMENTS

| | | | |
|---|---|---|---|
| 9,007,405 B1* | 4/2015 | Eldar | G09G 5/02 |
| | | | 345/666 |
| 2002/0010723 A1* | 1/2002 | Nielsen | G06F 17/30905 |
| | | | 715/269 |
| 2007/0220010 A1* | 9/2007 | Ertugrul | G06Q 30/02 |
| 2008/0252662 A1* | 10/2008 | Hyatt | 345/660 |
| 2009/0183068 A1* | 7/2009 | Bard | G06F 17/30905 |
| | | | 715/252 |
| 2010/0328317 A1* | 12/2010 | Lindfors | 345/468 |
| 2011/0126119 A1* | 5/2011 | Young et al. | 715/744 |
| 2012/0110438 A1* | 5/2012 | Peraza et al. | 715/243 |
| 2012/0311435 A1* | 12/2012 | Weeldreyer et al. | 715/243 |
| 2013/0067398 A1* | 3/2013 | Pittappilly et al. | 715/800 |

* cited by examiner

SYSTEM AND METHOD FOR CONTENT SIZE ADJUSTMENT

CROSS REFERENCE TO RELATED APPLICATION

This application claims priority from U.S. Provisional Application No. 61/559,784 filed on Nov. 15, 2011, which is incorporated by reference in it entirety herein.

BACKGROUND

The field relates generally to content rendering in a computing environment.

A touchscreen is an electronic visual display that detects the presence and location of a touch by a finger or a stylus within the display area. Touchscreens are commonly used in devices such as tablet computers, smartphones, personal digital assistants (PDAs), video games, satellite navigation devices and other computer displays.

Due to the limitation of the screen size on a mobile device, it is challenging to fit the rich content of an entire we page into the small screen of the mobile device. As a result, users may have to constantly zoom around a web page on a mobile device to find content of interest. The problem is exacerbated by the fact that users ma have to repeat the same zooming in/out process on each website they visit.

Some browsers attempt to address this issue by generating a uniform response associated with certain user gestures. For example, when the users perform a double-tap gesture, some browsers either fit an entire column or web page into the screen or alternatively invoke the maximal zoom level. However, such a conventional approach does not take individual users preferences into consideration and accordingly fails to provide an ideal user browsing experience.

SUMMARY

In general, one innovative aspect of the subject matter described in this specification may be embodied in methods that include the actions of detecting a user gesture changing a size of a first content area displayed on a touchscreen, determining that the user has found an optimal font size based on the user gesture detected, calculating an average font size of the first content area, receiving an indication to display a second content area, displaying the second content area on the touchscreen, adjusting the font size of the second content area based on the average font size of the first content area, and displaying the second content area with the adjusted font size.

Another innovative aspect of the subject matter described in this specification may be embodied in methods that include receiving gesture information of a user changing a size of a content area on a touchscreen of the local computing device, determining that the user has found an optimal font size based on the user gesture detected, calculating an average font size based on one or more previous font sizes selected by the user, and providing the calculated average font size to the touchscreen of the local computing device. Therefore, the font size displayed on the touchscreen of the local computing device is adjusted to the average font size provided.

Other aspects of the disclosure include corresponding systems, apparatus, and computer programs, configured to perform the actions of the methods, encoded on computer storage devices.

Further aspects, features, and advantages of the present disclosure, as well as the structure and operation of the various aspects, are described in detail below with reference to the accompanying drawings.

BRIEF DESCRIPTION OF THE FIGURES

In the drawings, like reference numbers may indicate identical or functional similar elements. The drawing in which an element first appears is typically indicated by the leftmost digit or digits in the corresponding reference number.

DETAILED DESCRIPTION

Disclosed herein is a content size adjustment system a psychic zoom system) for inferring and predicting a readable font size of a content area displayed on a touchscreen. Unlike a conventional system which requires a lengthy adjustment process for the user to identify the desirable font size, a content size adjustment system, described in the aspect herein, provides a quick way to infer a readable font size of the content area according to the user's touch gestures, such as a pinch gesture.

Figure 1A:
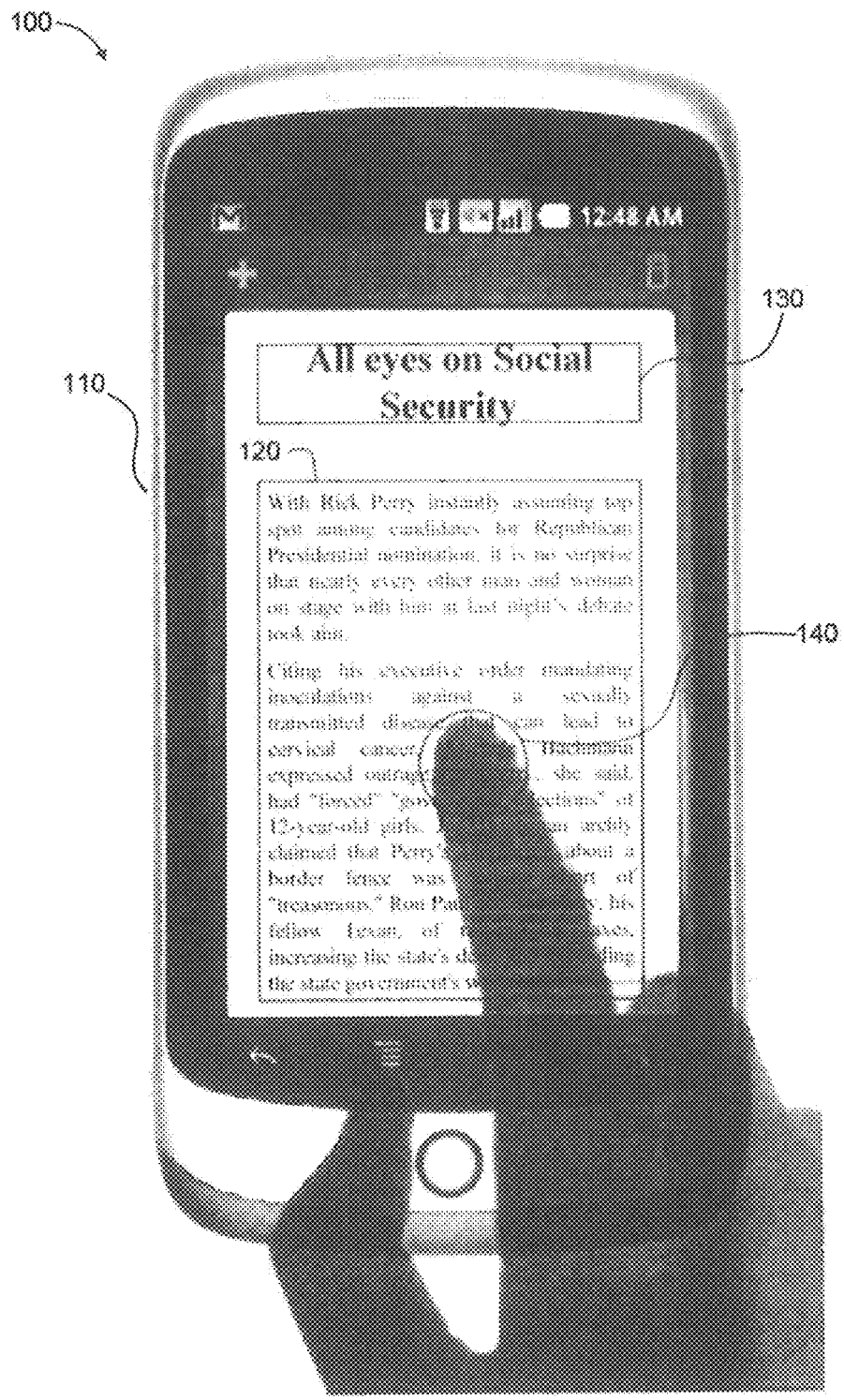
FIG. 1A is an illustration of an example display view before a user performs a pinch gesture, according to an aspect.

FIG. 1A is an illustration of an example display view before is user performs a pinch gesture, according to an aspect, in this example, on a touchscreen of computing device 100, the content area displayed to a user may be divided into a body 120 and a heading 130. The circle 140 in FIG. 1A illustrates a content area of interest to the user. Based on the size of the textual content area displayed on a touchscreen, the user may employ various touch gestures to interact, with the computing device to adjust the content area displayed.

A gesture refers to a motion used to interact with touchscreen interfaces. For example, a single-finger swipe is used to move an object between two points, while a simple tap selects an object on the touchscreen. A two-finger maneuver such as a pinch may be used to zoom out on an image or textual content area, by pinching together the thumb and finger. Likewise, a reverse pinch may enlarge a content area by spreading two fingers apart. For ease of illustration, a pinch gesture refers to both a pinch and a reverse pinch gestures in this application. Gestures of three or four fingers are also commonly used in ninny devices with a touch interface. Other gestures such as drag, pan, scroll, pinch open, and pinch close are supported by many touch interfaces as well.

As illustrated in FIG. 1A, because the content displayed in area 140 provides less than optimal readability, the user may engage in a series of gestures such as double tap, pinch, reverse pinch, and panning gestures to adjust the viewable content area to her satisfaction. Thus, in a conventional touch interface, a user has to take extra time and effort to manually adjust the content area until the desired display view is rendered. Nevertheless, the content size adjustment system may be able to shorten or bypass this manual process as shown in FIGS. 1B and 1C below.

Figure 1B:
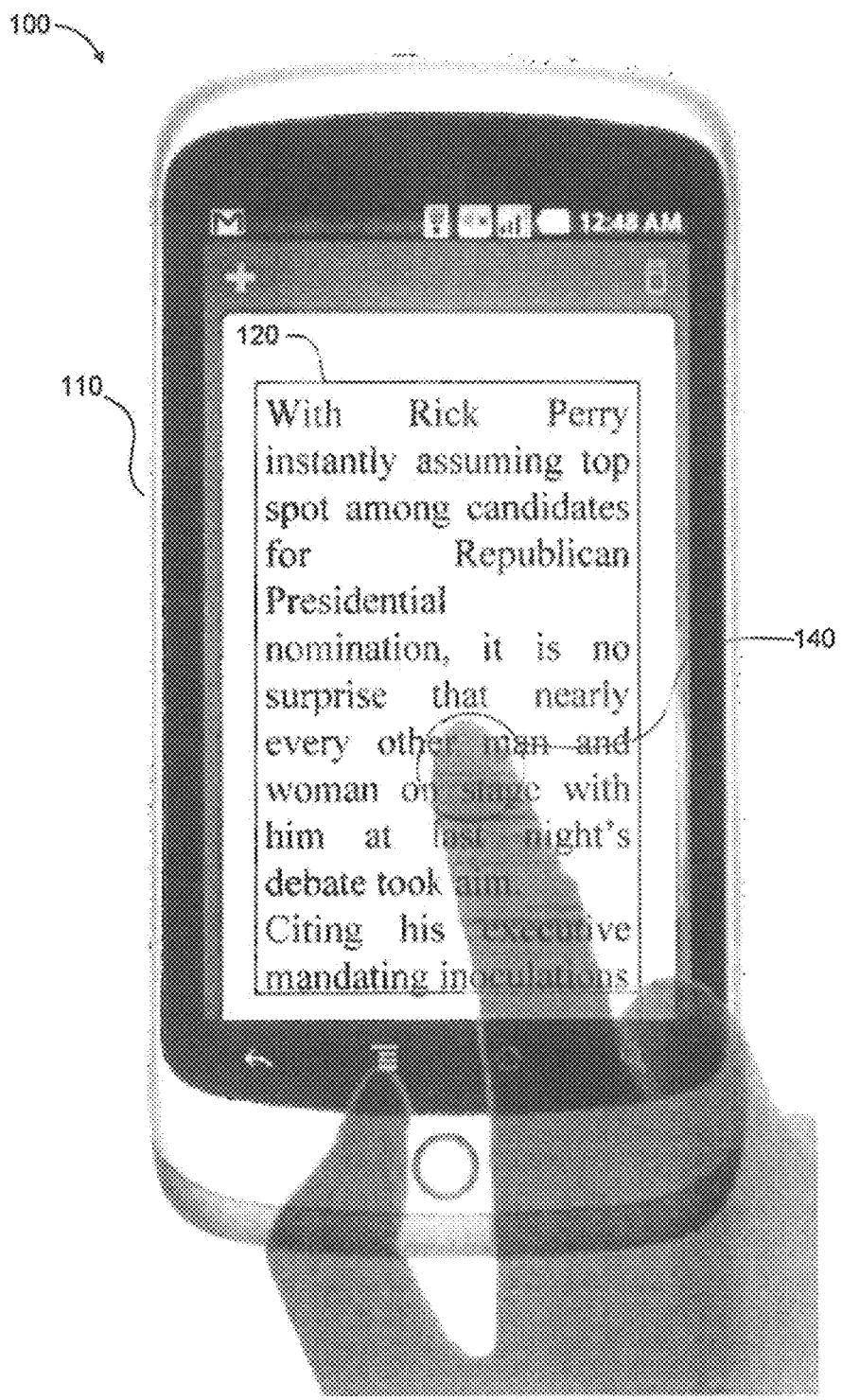
FIG. 1B is an illustration of an example display view transformation after a user performs a pinch gesture, according to an aspect.
Figure 1C:
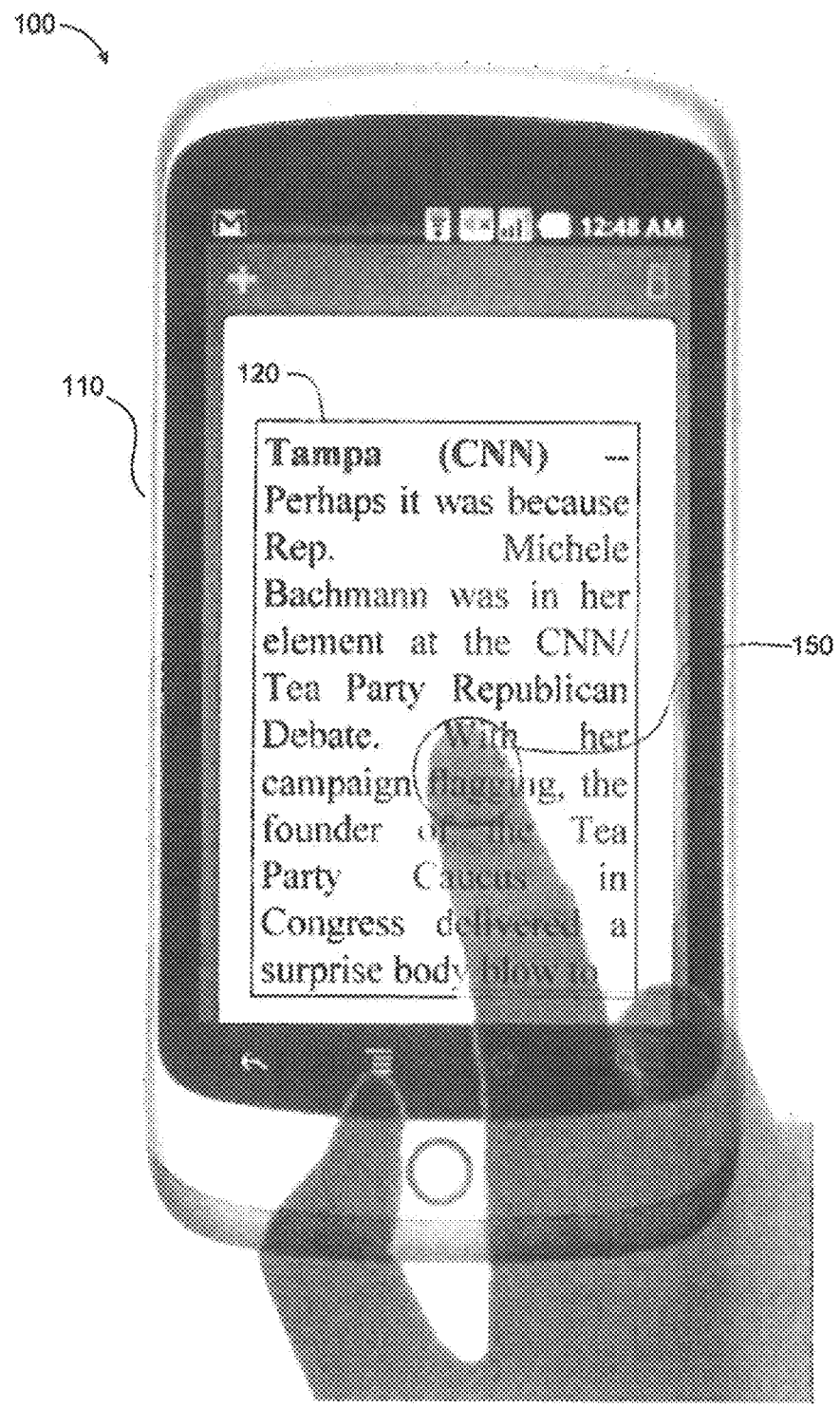
FIG. 1C is an illustration of an example display view of the same user in FIGS. 1A and 1B that navigates to a new content area, according to an aspect.

FIG. 1B is an illustration of an example display view transformation after a user performs a pinch gesture, according to an aspect of the disclosure. The pinch gesture in FIG. 1B effectively magnifies body 120 of the viewable content area to the user's preferred zoom level with fewer rows of data being displayed. As a result, a new display view 110 is yielded after the transformation from FIG. 1A to FIG. 1B.

Upon a user changing the size of the content area displayed on the touchscreen of computing device 100, content site adjustment system may detect the corresponding gesture that the user operates. For example, a gesture sensor or recognizer can be implemented using, hardware or software, or a combination thereof to identify the type of the touch gesture. Given that every gesture involves a start and end points, each point may be represented by two directions, a horizontal X axis and a vertical Y axis on the touchscreen. By measuring their positions on the X and Y axis and comparing their relative positions to each other, the start and end points can be used to identify the type of the gesture.

In the event that the content size adjustment system detects a gesture of interest, such as a pinch or as double tap gesture, it may determine that the user has identified an optimal font size and proceed to calculate an average font size of the content area represented by body 120. The user may designate as new area of interest at circle 140 and choose to adjust further to refine the size of the viewable content area. Accordingly, the content size adjustment system may detect these further gestures of refinement, and calculate the corresponding average font size of the content area, which most precisely reflects the user's preference. In this example, only a pinch gesture is referenced between the transformation of two display views of FIGS. 1A and 1B. Indeed, the user may perform a combination of gestures to obtain the desired zoom level at FIG. 1B. The content illustrated in FIG. 1A and 1B is all text, but a person of ordinary skill in the art would readily recognize that the content may also be pictures, video, and any other related content types.

Equipped with the calculated average font size inferred from previous user gestures, the content size adjustment system may predict the readable font size that the user most likely desires when a new content is presented, as illustrated in FIG. 1C.

FIG. 1C is an illustration of an example display view of the same user in FIGS. 1A and 1B that navigates to a new content area 120, according to an aspect. Content size adjustment system may receive on indication to display a new content area at 120. For example the user may scroll to new content area 120 located on the same web page as in FIGS. 1A and 1B. Alternatively, the user may navigate to new content area 120 residing on a different web page by entering a new URL (Universal Resource Locator) or tapping on a hyperlink on the original page to load a new web-based document. Accordingly, the content size adjustment system may display the newly requested content area 120 on touchscreen 110.

Significantly, content size adjustment system may automatically adjust the font size of the newly requested content area 120 based on the average font size of the viewable content area previously calculated and display the newly requested content area 120 with the adjusted font size. As a result, the web page is displayed at content area 120 with the same font size as calculated from FIG. 1B. For example, as indicated by circle 150 of the area of interest to the user, the viewable content area is adjusted with the same font size of that contained in FIG. 1B.

The adjustment may apply to every new web page the user visits. The adjustment may instead be a one-time modification, a permanent modification or a semi-permanent modification. Alternatively, the modification may be reset after the computing device is reset, powered-off or is left idle for a predetermined amount of time. The same mechanism may also be applicable to non-touch display devices, such as, a touch pad peripheral control device coupled to a non-touch display device. Because the font size of the content area can be represented by an average pixel height of a viewable content area, the content of interest may reference non-textual format as well. For example, the viewable content area may include images, video, multimedia plug-ins, such as, macromedia, flash, and may be compatible with HTML5 tags, <video>, <audio>, etc.

Figure 2:
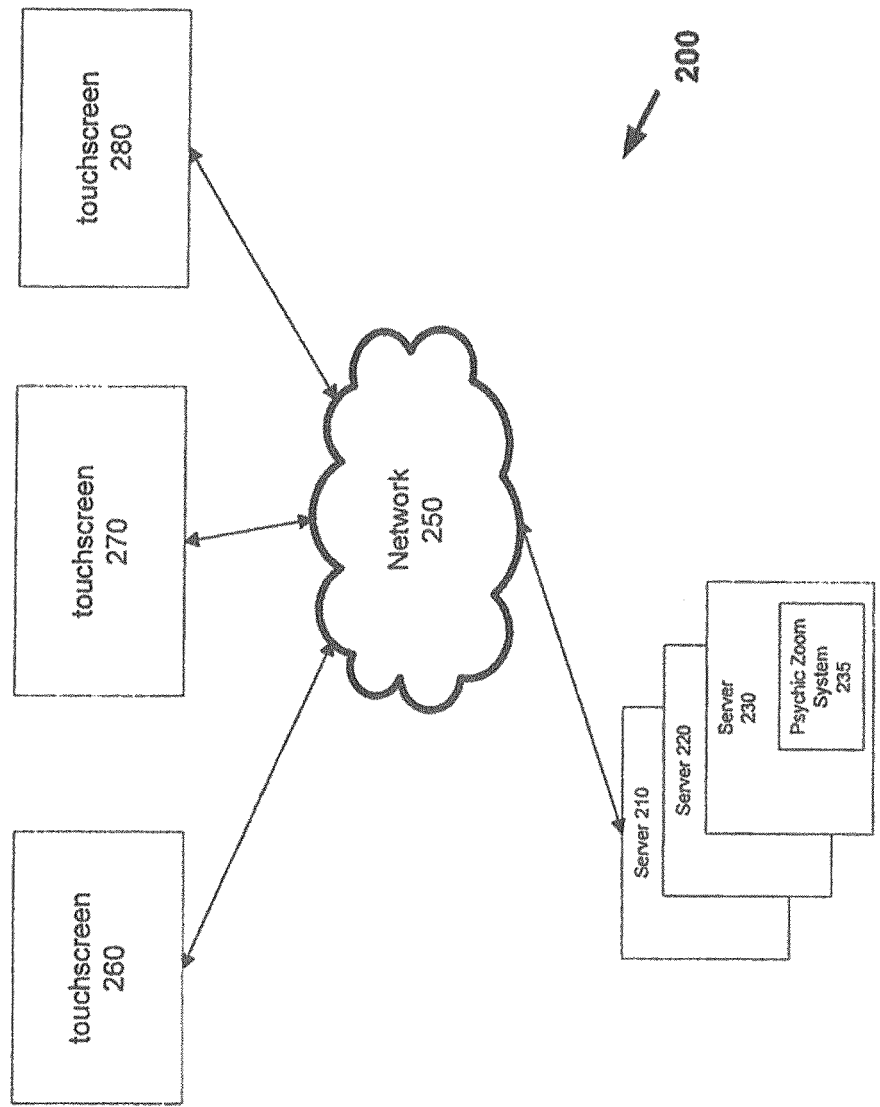
FIG. 2 is a diagram illustrating an example distributed system.

FIG. 2 is a diagram illustrating an example distributed system, In one aspect, system 200 includes servers 210, 220, and 230, a content size adjustment system 235 (e.g., a psychic zoom system), a network 250, and touchscreen 260, 270, and 280.

Touchscreens 260, 270, and 260 may communicate with one or more servers 210, 220 and 230 over network 250, The number of touchscreens 260, 270, and 280 and servers 210, 220, and 230 is illustrative and not intended to be limiting as fewer or greater numbers of touchscreens or servers may be used. Network 250 may be any network or combination of networks that carry data. Such networks can include, but are not limited to, a local area network, medium area network, or wide area network such as the Internet.

In this aspect, one or more of servers 210, 220, and 230 can host a content size adjustment system 235. As illustrated in FIG. 2, touchscreens 260, 270, and 280 may send data requests to servers 210, 220, and 230, which may in turn invoke system 235 for further processing. System 235 may infer and predict a desirable font size by calculating an average font size from One or more previous font sizes selected by the user.

Alternatively, system 235 may reside on touchscreens 260, 270, and 280 (not shown). Based on the gesture information of a user changing a size of a first content area, touchscreens 260, 270, and 280 may calculate the average font size of the first content area and display a second content area according to the average font size of the first content area, upon receiving a request to display the second content area on the touchscreen. Moreover, system 200 may comprise a combination of psychic zoom systems 235 residing both on touchscreens 260, 270, and 280 and servers 210, 220, and 230 respectively.

Content size adjustment system 235 may be software, firmware, or hardware or any combination thereof in a computing device. System 200 may be implemented on or implemented with one or more computing devices. A computing device may be an type of computing device having one or more processors and memory. For example, a computing device may be. a computer, server, workstation, mobile device (e.g., a mobile phone, personal digital assistant, navigation device, tablet, laptop or any other user carried device), game console, set-top box, kiosk, embedded system or other device having at least one processor and memory. A computing device may include a communication port or I/O device (Input/output device) for communicating over wired or wireless communication link(s). A further example of a computing device is described with respect to FIG. 6 below.

Figure 3:
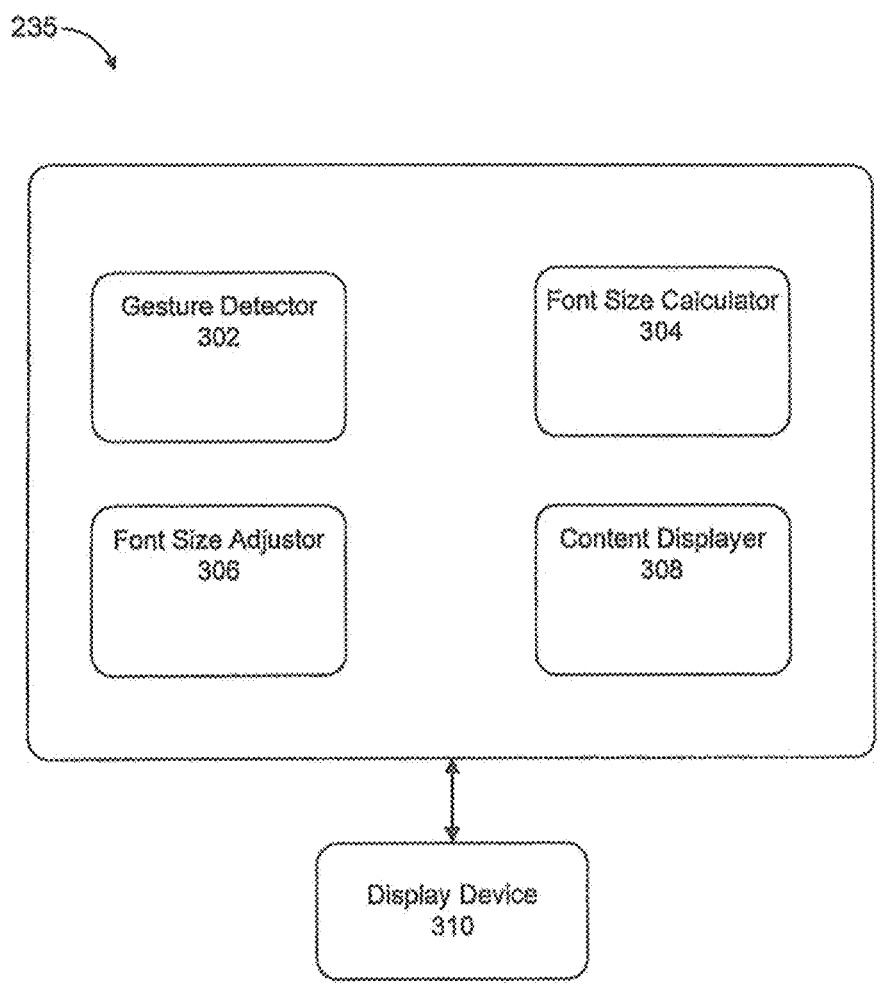
FIG. 3 is an illustration of a content size adjustment system.

FIG. 3 is an illustration of a content size adjustment system (e.g., a psychic zoom system). A content size adjustment system 235 may include components to provide display view transformation such as that illustrated in FIG. 1C when the user navigates to a new content area. A content size adjustment system 235 may include a gesture detector 302, a font size calculator 304, a font size adjustor 306, and a content displayer 308.

A content size adjustment system 235 may be coupled to display device 310. Display device 310 may be a touchscreen on any device, which provides display view, as shown in FIGS. 1A-1C, in response to a user's touch gesture. A touchscreen enables a user to interact with the display of a device with a finger, hand, or stylus directly, rather than through an intermediate pointer controlled by a mouse or touchpad. There are a variety of technologies implementing a touchscreen. For example, a resistive touchscreen panel is composed of separated electrically conductive layers separated by a narrow gap. When a finger presses down on a point on the surface, the two layers become connected and causes a change in the electrical current, which registered as a touch event. Alternatively, a capacitive touchscreen panel includes an insulator such as a glass coated with a transparent conductor. In response to a touch by a user, the human body acts as an electrical conductor, which in turn causes a change in the capacitance of the screen. Therefore, the location of the touch is sent to the controller for processing. A person of ordinary skill in the art would appreciate that other touchscreen technologies such as infrared, and optical imaging technologies are applicable in the present disclosure.

Display device 310 may receive user input as keystrokes, pinches, or other senses detected from the user. These inputs from the user are received by gesture detector 302 that interprets the inputs as commands on how to operate on or manipulate content area displayed on display device 310. Gesture detector 302. in turn triggers the corresponding components of content size adjustment system 235 for further processing. For example, a user views a content area displayed on the touchscreen with a zoom level of 0.4. The user may zoom in on the content area (e.g., by pinching a content area of interest and expanding the fingers) to increase the zoom level to 0.5. Gesture detector 302 may receive this pinch gesture as input and determine that the user has found, an optimal font size. Therefore gesture detector 302 may trigger font size calculator 304 to obtain an average font size on the viewable content area.

Gesture detector 302 may be further configured to receive an indication to display a content area on display device 310. For example, when a user navigates to a new content area by scrolling down on the same web page on display device 310, gesture detector 302 receives the scrolling gesture as an input and triggers content displayer 308 to display the requested content on display device 310, in another example, a user taps on a hyperlink on a web page to request a new content area residing on a different web page. Gesture detector 302 receives the tap gesture as an input and triggers content displayer 308 to display the requested content on display device 310.

Font size calculator 304 may be configured to calculate an average font size of a content area displayed on display device 310. In one aspect, when font size calculator 304 is triggered by certain gestures such as a pinch or double tap that are received by gesture detector 302, font size calculator 304 calculates an average pixel height of majority of the viewable content area, such as the body of the viewable content where content size adjustment system 235 deems to be relevant to the font size calculation. For ease of reference and accuracy, other portions of the content area, such as the headings, footers are ignored for the purpose of calculating the average font size. The calculated average font size may be passed on to font size adjustor 306.

Font site adjustor 306 may be configured to adjust the size of the content area based on the average font size of one or more previously displayed content areas selected by the user. In one aspect, font size adjustor 306 receives, from font size calculator 304, an average font size of a content area that a user most recently visited and viewed, as indicated by user panning over the content for a prolonged period of time. Font size adjustor 306 communicates with content displayer 308 to apply the average font size to any new content requested by the same user. In another aspect, font size adjustor 306 receives, from font size calculator 304, an average font size of several content areas that the user previously visited and viewed.

Content displayer 308 may be configured to display the content area with the adjusted font size on display device 310. According to the gestures received by gesture detector 302, gesture detector 302 may directly invoke content displayer 308 to display content on display device 310. For example, when gesture detector 302 receives a "scrolling" gesture to navigate a new content on the same web page or a "tap" gesture to follow a hyperlink to navigate to a content area residing on a different web page, gesture detector 302 invokes content displayer 308 directly to provide the requested content on display device 310. Alternatively that size adjustor 306 may communicate with content displayer 308 to apply the calculated average font size received from font size calculator 304 and content displayer 308 can display the content area with the adjusted font size accordingly.

Figure 4:
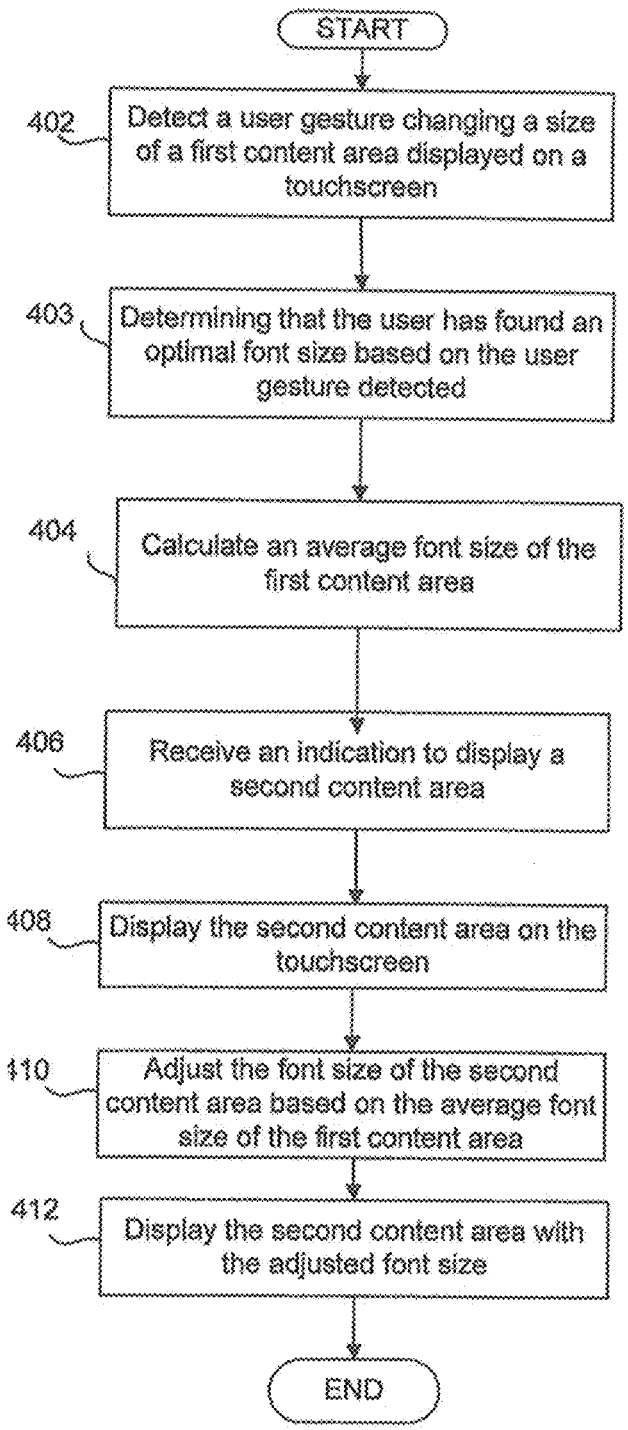
FIG. 4 is an illustration of a flow diagram of an example method, according to an aspect.

FIG. 4 is an illustration of how diagram of an example method, according to an aspect of the disclosure.

At stage 402, a user gesture is detected that is associated with changing a size of a first content area displayed on a touchscreen. In one aspect, the user gesture associated with changing a size of a first content area includes a pinch gesture or a double tap gesture. For example, upon interacting with display device 310, as user may perform a pinch gesture followed by panning around a content area. Gesture detector 302 may take cues from these gestures as indication that the user has found the optimal zoom level or font size of the viewable content area. Thus, gesture detector 302 interprets the gestures a user performs on display device 310 and gesture detector 302 triggers font size calculator 304 for further processing.

At stage 403, it is determined that the user has found optimal font size based on the gesture detection at 402. For example, gesture detector 302 determines whether the user has found an optimal font size based on indicators gathered from the user gesture or combination of gestures. There may be strong and weak indicators to infer the user's preferences. In one aspect, if as user pans over as content area followed by a pinch gesture, this can be considered as a strong indicator that the user has identified an optimal font size. In another aspect, if the user spends a prolonged time scrolling a content area, this can be considered a weak indicator that the font size on the content area is optimal, In still another aspect, if a user spends considerable time on a content area without performing any gesture, this can be considered a weak indicator that the user is actually reading the content and thus the font size is optimal. The indicators can he combined together to provide more accurate predictions of the readable font size the user prefers.

At stage 404, an average font size of the first content area is calculated. For example, font size calculator 304 receives inputs from gesture detector 302 regarding the location and size of the first content area of interest. Font size calculator 304 may subsequently parse through the viewable content area to identify a relevant area for the purpose of calculating font size. As mentioned above, in the event that a textual content area includes, heading, body, and footer areas, font size calculator may discard the heading, footer and other irrelevant content areas, and may thus only take measurement of the font size of the body. In one aspect, the font size can be represented as an average pixel height of a viewable content area of the body of the textual content. In another aspect, the font size can be represented as a zoom level such as 0.5, corresponding to 50% of the relevant web page may be visible in display view 120.

At stage 406, an indication to display a second content area is received. For example, gesture detector 302 receives from display device 310 an indication to request a new content area to be displayed. Gesture detector 302 may identify specific types of gestures, such as a scrolling or a tap gesture and associate these gestures with the user's request to display a second content area on the same web page or a different web page respectively. Gesture detector 302 may further trigger content displayer 308 for further processing.

At stage 408, the second content area is displayed on display device 310. In one aspect, content displayer 308 receives from gesture detector 302 an URL, URI (Universal Resource Indicator), or other resource identifiers associated with the user's request on certain content on the internet. For example, if a used taps on a hyperlink to request a second content area to be displayed, in this case, the resource of the first content contains hyperlink as a reference to the content of the second resource. A relative link may be used to define the location of the second resource via relative URLs, Specifically, such relative URLs are dependent on the original URL containing a hierarchical scheme, such as the ftp (file transfer protocol), http (hyper-text transfer protocol), and file URL schemes. Consequently, content displayer 308 follows the corresponding resource identifier and displays the second content area on display device 310.

At stage 410, the font size of the second content area is adjusted based on the average font size of the first content area. In one aspect, font size adjustor 306 receives the calculated average font size from font size calculator 304 and identifies it as the optimal zoom level the user prefers. For example, font size adjustor 306 makes the optimal zoom level sticky and automatically sets the default zoom level to this value, in the event the same user re nests a new content area to be displayed on display device 310.

Alternatively, font size adjustor 306 may adjust the font size of the second content area when a user performs a double-tap gesture. For example, once the optimal MGM level for a user is identified, font size adjustor 306 works in concert with gesture detector 302 to recognize user's intention to reset the font size upon receiving a double tap gesture. Accordingly, font size adjustor 306 sets the zoom level on the viewable content area to be the optimal zoom level identified when the user performs a double tap gesture.

Figure 5:
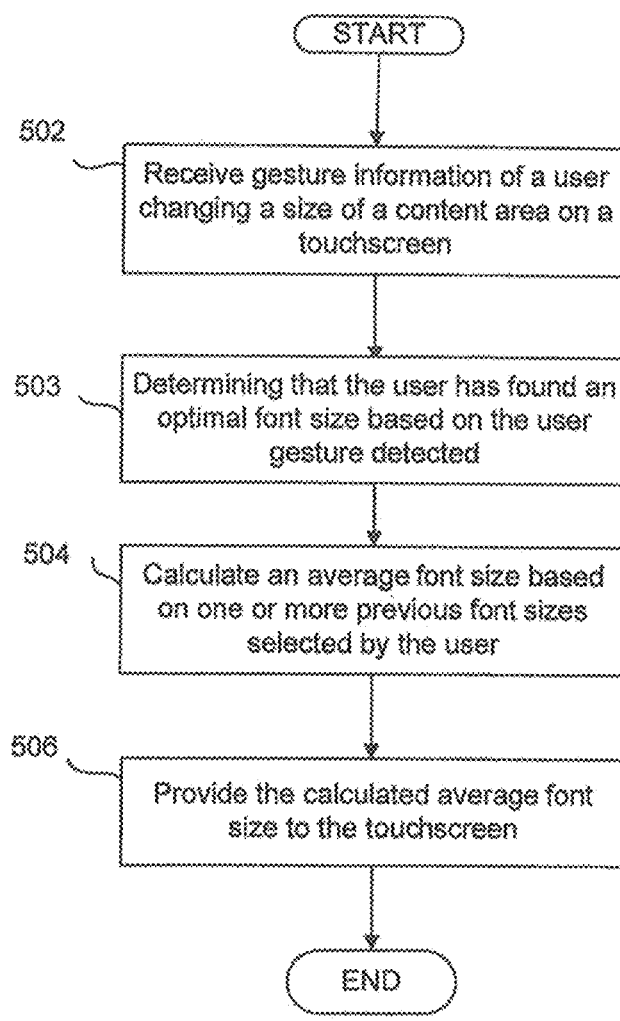
FIG. 5 is an illustration of a flow diagram of another example method, according to an aspect.

FIG. 5 is an illustration of a flow diagram of another example method, according to an aspect of the disclosure.

At stage 502, gesture information of a user changing a tint size of a content area on display interface 310 of local computing device 110 is received. Similar to the discussion in FIG. 4 above, gesture detector 302 may receive and identify a user's gestures and may further interpret certain gestures as an indication that the user desires to change a font size of a content area.

At stage 503, a determination is made regarding whether the user has found an optimal font size based on the gesture information received. As discussed in FIG. 4, one or more indicators can be considered to infer a user's preference and whether the font size of the first content area reflects an optimal font size.

At stage 504, an average font size based on one or more previous font sizes selected by the user is calculated. Likewise, font size calculator 304 may perform such calculation. In one aspect, a content size adjustment system 235 maintains a state table over time (e.g., a time table). For example, a tune table may contains five entries—0.5, 0.5, 0.8, 0.5 and 0.4—corresponding to the desirable zoom levels a user has selected on previous occasions. Font size calculator 304 may take a mean value of all five entries as an optimal zoom level the used prefers.

In one aspect, font size calculator 304 may calculate the average font size without using one or more previous font sizes selected by the user that exceed a deviation threshold that font size calculator 304 deems as extreme values. For example, in a state table maintained by system 235, which includes five, entries of 0.5, 0.5, 0.9, 0.4, and 0.5, corresponding to font sizes selected by a user on different occasions. Font size calculator 304 discards extreme large or small values such as 0.9 in this case according to a deviation threshold. Thus, the optimal font size is obtained by averaging the remaining 4 values.

Notably, the process of selecting the optimal font size contains a self-correcting mechanism. If font size calculator 304 makes predictions inconsistent with the user's expectation as reflected by the user's gestures of continuous pinching and panning for example, new values are submitted to the state table which in turn affects the average font size calculated. Conversely, if font size calculator 304 keeps making the right prediction, the corresponding font sizes may not necessarily be entered into the state table.

At stage 506, the calculated average font size is provided to display device 310. In one aspect, font size adjustor 306 receives the calculated average font size and communicates with content displayer 308 to display the requested content area. The displayed content is further adjusted to apply the calculated average font size. According to another aspect, stages 502-506 may be performed by system 235 residing on servers 260, 270, and 280 in FIG. 2.

Figure 6:
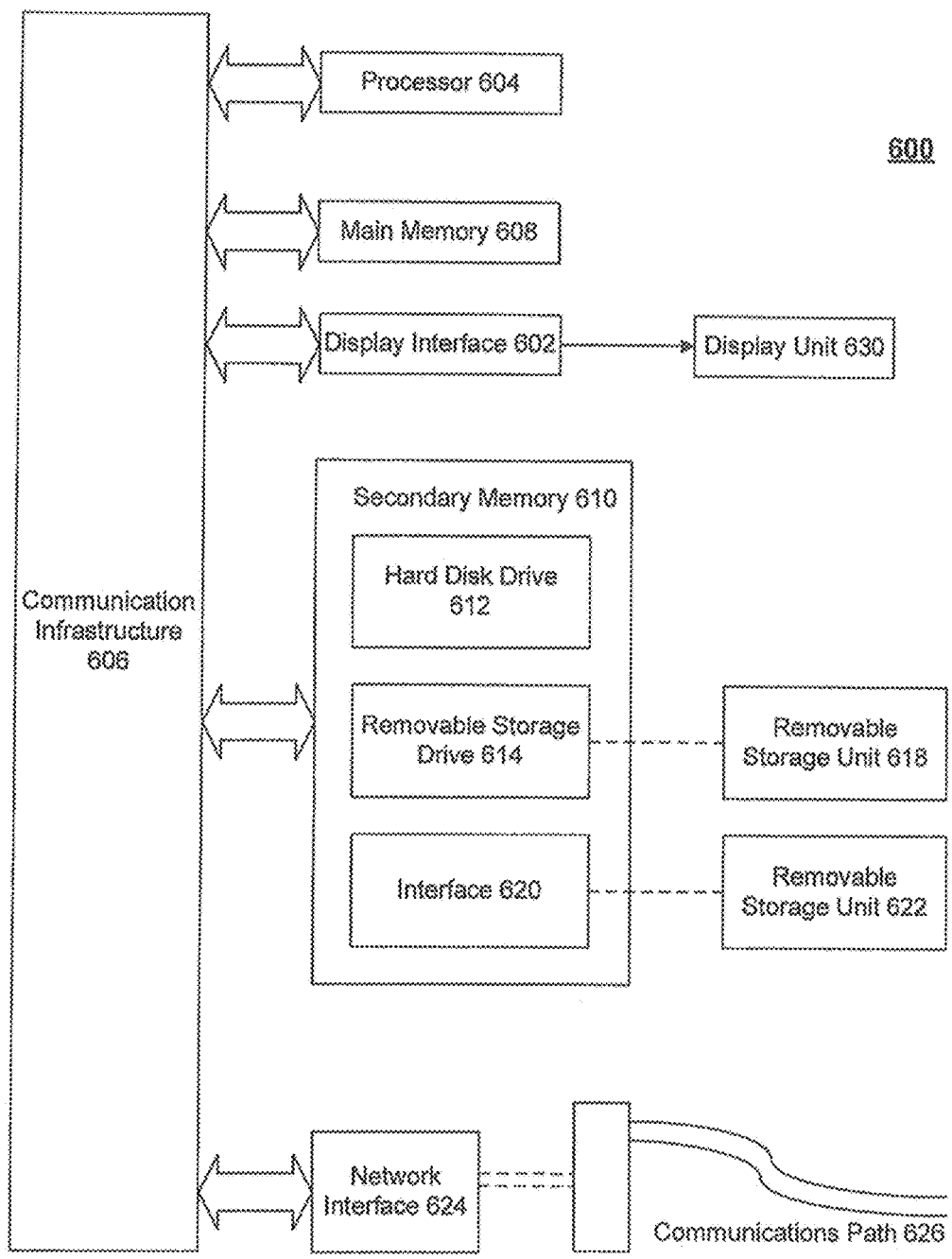
FIG. 6 is a diagram of an example computer system.

FIG. 6 illustrates an example computer system 600 in which aspects, or portions thereof, may be implemented as computer-readable code. For example, system 235, including its components, as shown in FIGS. 2 and 3 may be implemented in computer system 600 using hardware, software, firmware, tangible computer readable media having instructions stored thereon, or a combination thereof and may be implemented in one or more computer systems or other processing systems. Hardware, software, or any combination of such may embody any of the modules and components in FIGS. 2 and 3.

If programmable logic is used, such logic may execute on a commercially available processing platform or a special purpose device. One of ordinary skill in the art may appreciate that aspects of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described aspects. A processor device may be a single processor, a plurality of processors, or combinations thereof Processor devices may have one or more processor "cores."

Various aspects of the disclosure are described, in terms of this example computer system 600. After reading this description, it will become apparent to a person skilled in the relevant art how to implement aspects of the disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition in some aspects the order of operations may be rearranged without departing from the spirit of the disclosed subject matter.

Processor device 604 may be a special purpose or a general purpose processor device. As will be appreciated by persons skilled in the relevant art, processor device 604 may also be a single processor in a multi-core/multiprocessor system, such system operating alone, or in a cluster of computing devices operating in a cluster or server farm. Processor device 604 is connected to a communication infrastructure 606, for example, a bus, message queue, network, or multi-core message-passing scheme.

Computer system 600 also includes a main memory 608, for example, random access memory (RAM), and may also include a secondary memory 610. Secondary memory 610 may include, for example, a hard disk drive 612, removable storage drive 614. Removable storage drive 614 may comprise a floppy disk drive, a magnetic tape drive, an optical disk drive, a flash memory, or the like. The removable storage drive 614 reads from and/or writes to a removable storage unit 618 in a well-known manner. Removable storage unit 618 may comprise a floppy disk, magnetic tape, optical disk, etc. which is read by and written to by removable storage drive 614. As will be appreciated by persons skilled in the relevant art, removable storage unit 61 includes a computer usable storage medium having stored therein computer software and/or data.

In alternative implementations, secondary memory 610 may include other similar devices for allowing computer programs or other instructions to be loaded into computer system 600. Such devices may include, for example, a removable storage unit 622 and an interface 620. Examples of such devices may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a network interface 624. Network interface 624 allows software and data to be transferred between computer system 600 and external devices. Network interface 624 may include a modem, a network interface (such as an Ethernet card), a communications port, a PCMCIA slot and card, or the like. Software and data transferred via network. interface 624 may be in the form of signals, which may be electronic, electromagnetic, optical, or other signals capable of being received by network interface 624. These signals may be provided to network interface 624 via a communications path 626. Communications path 626 carries signals and may be implemented using wire or cable, fiber optics, a phone line, a cellular phone link, an RF link, or other communications channels.

In this document, the terms "computer program medium" and "computer usable medium" are used to generally refer to tangible, non-transitory media such as removable storage unit 618, removable storage unit 622, and a bard disk installed in hard disk drive 611 Computer program medium and computer usable medium may also refer to memories, such as main memory 608 and secondary memory 610, which may be memory semiconductors (e.g. DRAMs, etc.).

Computer programs also called computer control logic) are stored in main memory 608 and/or secondary memory 610. Computer programs may also be received via network interface 624. Such computer programs, when executed, enable computer system 600 to implement aspects as discussed herein. In particular, the computer programs, when executed, enable processor device 604 to implement the processes of aspects of the present disclosure, such as the stages in the methods illustrated by flowcharts of FIGS. 4 and 5, discussed above. Accordingly, such computer programs represent controllers of the computer system 600. Where aspects are implemented using software, the software may be stored in a computer program product and loaded into computer system 600 using removable storage drive 614, interface 620, and hard disk drive 612, or network interface 624.

Aspects of the disclosure also may be directed to computer program products including software stored on any computer useable medium. Such software, when executed in one or more data processing device(s), causes the data processing device(s) to operate as described herein. Aspects of the disclosure employ any computer useable or readable medium. Examples of computer useable mediums include, but are not limited to, primary storage devices (e.g., any type of random access memory), secondary storage devices (e.g., hard drives, floppy disks, CD-ROMS, ZIP disks, tapes, magnetic storage devices, and optical storage devices, MEMS, nano-technological storage device, etc.), and communication mediums (e.g., wired and wireless communications networks, local area networks, wide area networks, intranets, etc.).

The Summary and Abstract sections may set forth one or more but not all exemplary aspects of the present disclosure as contemplated by the inventor(s), and thus, are not intended to limit the present disclosure and the appended claims in any way.

Aspects of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific aspects will so fully reveal the general nature of the disclosure that others can, by applying knowledge within the skill of the art, readily modify and/or adapt for various applications such specific aspects, without undue experimentation, without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary aspects, but should be defined only in accordance with the following claims and their equivalents.

The invention claimed is:

1. A computer-implemented method, comprising:
providing for display a first content area on a touchscreen at a first zoom level;
detecting a first type of user gesture, the first type of user gesture associated with changing a size of the first content area displayed on the touchscreen, the size of the first content area being changed to be displayed at a second zoom level;
determining a first indicator that a font size of the first content area displayed at the second zoom level is a particular font size;
calculating, in response determining the first indicator, an average font size of the first content area displayed at the second zoom level;
determining a mean value of the calculated average font size and a plurality of stored font sizes, each of the plurality of stored font sizes corresponding to a zoom level previously selected by a user, wherein determining the mean value of the calculated average font size and the plurality of stored font sizes further comprises:
discarding, in determining the mean value, at least one of the calculated average font size and the plurality of stored font sizes based on a deviation threshold, and determining, after the discarding, the mean value based on remaining font sizes from the calculated average font size and the plurality of stored font sizes;
receiving an indication to display a second content area on the touchscreen;
displaying, in response to the received indication, the second content area on the touchscreen;
detecting a second type of user gesture associated with viewing the second content area displayed on the touchscreen, the second type of user gesture being different than the first type of user gesture and detected subsequent to the detected first type of user gesture;
determining, in response to the second type of user gesture, a third zoom level to display the second content area based on the mean value;
and displaying the second content area at the third zoom level.

2. The computer-implemented method of claim 1, wherein the first type of user gesture includes a pinch gesture or a double tap gesture.

3. The computer-implemented method of claim 1, wherein detecting the second type of user gesture comprises detecting a panning gesture over the first content area for a predefined period of time.

4. The computer-implemented method of claim 1, wherein detecting the first type of user gesture comprises detecting a pinch gesture, and wherein detecting the second type of user gesture comprises detecting a panning gesture over the first content area.

5. The computer-implemented method of claim 1, wherein detecting the second type of user gesture comprises detecting a scrolling gesture over the first content area for a predefined period of time.

6. The computer-implemented method of claim 1, wherein the first content area and the second content area are located on a same page.

7. The computer-implemented method of claim 1, wherein the first content area and the second content area are located on different pages.

8. The computer-implemented method of claim 1, wherein calculating the average font size of the first content area further comprises:
calculating an average pixel height of the first content area.

9. The computer-implemented method of claim 1, wherein calculating the average font size of the first content area further comprises:
calculating an average font size of a viewable content area of the touchscreen.

10. The computer-implemented method of claim 9, wherein the viewable content area includes a body of the first content area.

11. The computer-implemented method of claim 9, wherein the viewable content area excludes a heading or a footer of the first content area.

12. The computer-implemented method of claim 1, further comprising:
adjusting the size of the second content area in response to a double tap gesture.

13. The computer-implemented method of claim 1, further comprising:
adjusting the size of the second content area based on a value calculated from previous user gestures associated with changing the size of the first content area.

14. The computer-implemented method of claim 1, further comprising:
wherein determining the first indicator that the font size of the first content area displayed at the second zoom level is the particular font size is based on a combination of gestures, the combination of gestures corresponding to when the first type of user gesture comprises a pinch gesture and the pinch gesture is preceded by a panning gesture.

15. The computer-implemented method of claim 1, wherein calculating the average font size of the first content area at the second zoom level further comprises: determining that the first content area includes heading or footer portions; and determining the average font size of the first content area at the second zoom level without using the heading or footer portions of the first content area.

16. The computer-implemented method of claim 1, wherein discarding, in determining the mean value, at least one of the calculated average font size and the plurality of stored font sizes based on the deviation threshold further comprises: discarding a respective font size corresponding to a largest value among the calculated average font size and the plurality of stored font sizes.

17. A computer-implemented method, comprising:
providing for display a first content area on a touchscreen of a local computing device at a first zoom level;
receiving, from the local computing device, information of a first type of user gesture, the first type of user gesture associated with changing a size of the first content area on the touchscreen of the local computing device, the size of the first content area being changed to be displayed at a second zoom level;

determining a first indicator that a font size of the first content area displayed at the second zoom level is a particular font size;

calculating, in response determining the first indicator, an average font size of the first content area displayed at the second zoom level:

determining a mean value of the calculated average font size and a plurality of stored font sizes, each of the plurality of stored font sizes corresponding to a zoom level previously selected by a user, wherein determining the mean value of the calculated average font size and the plurality of stored font sizes further comprises:

discarding, in determining the mean value, at least one of the calculated average font size and the plurality of stored font sizes based on a deviation threshold, and determining, after the discarding, the mean value based on remaining font sizes from the calculated average font size and the plurality of stored font sizes;

receiving, from the local computing device, an indication to display a second content area on the touchscreen of the local computing device;

providing for display, in response to the received indication, the second content area on the touchscreen of the local computing device;

receiving, from the local computing device, information of a second type of user gesture associated with viewing the second content area on the touchscreen, the second type of user gesture being different than the first type of user gesture and detected subsequent to the detected first type of user gesture;

determining, in response to the second type of user gesture, a third zoom level based on the mean value; and displaying the second content area at the third zoom level.

18. A system comprising:

one or more computers and one or more storage devices storing instructions that are operable, when executed by the one or more computers, to cause the one or more computers to perform operations comprising:

providing for display a first content area on a touchscreen at a first zoom level;

detecting a first type of user gesture, the first type of user gesture associated with changing a size of the first content area displayed on the touchscreen, the size of the first content area being changed to be displayed at a second zoom level;

determining a first indicator that a font size of the first content area displayed at the second zoom level is a particular font size;

calculating, in response to determining the first indicator, an average font size of the first content area displayed at the second zoom level determining a mean value of the calculated average font size and a plurality of stored font sizes, each of the plurality of stored font sizes corresponding to a zoom level previously selected by a user, wherein determining the mean value of the calculated average font size and the plurality of stored font sizes further comprises:

discarding, in determining the mean value, at least one of the calculated average font size and the plurality of stored font sizes based on a deviation threshold, and determining, after the discarding, the mean value based on remaining font sizes from the calculated average font size and the plurality of stored font sizes;

receiving an indication to display a second content area on the touchscreen;

displaying, in response to the received indication, the second content area on the touchscreen;

detecting a second type of user gesture associated with viewing the second content area displayed on the touchscreen, the second type of user gesture being different than the first type of user gesture and detected subsequent to the detected first type of user gesture;

determining, in response to the second type of user gesture, a third zoom level to display the second content area based on the mean value; and displaying the second content area at the third zoom level.

19. The system of claim 18, wherein the first type of user gesture includes a pinch gesture or a double tap gesture.

20. The system of claim 18, wherein the first content area and the second content area are located on same page.

21. The system of claim 18, wherein the first content area and the second content area are located on different pages.

22. The system of claim 18, wherein detecting the second type of user gesture comprises detecting a panning gesture over the first content area for a predefined period of time.

23. The system of claim 18, wherein detecting the first type of user gesture comprises detecting a pinch gesture, and wherein detecting the second type of user gesture comprises detecting a panning gesture over the first content area, the second type of user gesture being detected subsequent to the detected first type of user gesture.

24. The system of claim 18, wherein detecting the second type of user gesture comprises detecting a scrolling gesture over the first content area for a predefined period of time.

25. The system of claim 18, further comprising:
adjusting the size of the second content area in response to a double tap gesture.

26. The system of claim 18, further comprising:
adjusting the size of the second content area based on a value calculated from previous user gestures associated with changing the size of the first content area.

27. A system comprising:

one or more computers and one or more storage devices storing instructions that are operable, when executed by the one or more computers, to cause the one or more computers to perform operations comprising:

providing for display a first content area on a touchscreen of a local computing device at a first zoom level;

receiving, from the local computing device, information of a first type of user gesture from a user, the first type of user gesture associated with changing a size of the first content area on the touchscreen of the local computing device, the size of the first content area being changed to be displayed at a second zoom level;

determining a first indicator that a font size of the first content area displayed at the second zoom level is a particular font size;

calculating, in response determining the first indicator, an average font size of the first content area displayed at the second zoom level;

determining a mean value of the calculated average font size and a plurality of store font sizes, each of the plurality of stored font sizes corresponding to a zoom level previously selected by the user, wherein determining the mean value of the calculated average font size and the plurality of stored font sizes further comprises:
discarding, in determining the mean value, at least one of the calculated average font size and the plurality of stored font sizes based on a deviation threshold, and determining, after the discarding, the mean value based on remaining font sizes from the calculated average font size and the plurality of stored font sizes;
receiving, from the local computing device, an indication to display a second content area on the touchscreen of the local computing device;
providing for display, in response to the received indication, the second content area on the touchscreen of the local computing device;
receiving, from the local computing device, information of a second type of user gesture from the user associated with viewing the second content area on the touchscreen, the second type of user gesture being different than the first type of user gesture and received subsequent to the first type of user gesture; and
determining, in response to the second type of user gesture, a third zoom level based on mean value; and
displaying the second content area at the third zoom level.

28. A non-transitory computer-readable medium storing software comprising instructions executable by one or more computers which, upon such execution, cause the one or more computers to perform operations comprising:
providing for display a first content area on a touchscreen of a local computing device at a first zoom level;
receiving, from the local computing device, information of a first type of user gesture from a user, the first type of user gesture associated with changing a size of the first content area to be displayed at a second zoom level on the touchscreen of the local computing device;
determining a first indicator that a font size of the first content area displayed at the second zoom level is a particular font size;
calculating, in response determining the first indicator, an average font size of the first content area displayed at the second zoom level;
determining a mean value of the calculated average font size and a plurality of stored font sizes, each of the plurality of stored font sizes corresponding to a zoom level previously selected by the user, wherein determining the mean value of the calculated average font size and the plurality of stored font sizes further comprises
discarding, in determining the mean value, at least one of the calculated average font size and the plurality of stored font sizes based on a deviation threshold, and determining, after the discarding, the mean value based on remaining font sizes from calculated average font size and the plurality of stored font sizes;
receiving, from the local computing device, an indication to display a second content area on the touchscreen of the local computing device;
providing for display, in response to the received indication, the second content area on the touchscreen of the local computing device;
receiving, from the local computing device, information of a second type of user gesture from the user associated with viewing the second content area displayed on the touchscreen, the second type of user gesture being different than the first type of user gesture and received subsequent to the first type of user gesture;
determining, in response to the second type of user gesture, a third zoom level based on the mean value; and
displaying the second content area at the third zoom level.

* * * * *